88-112 CROSS REFERENCE SEARCH ROOM
178
514
X 266
X 265

*INVENTOR.*
P. M. G. TOULON
*BY* Moore & Hall
ATTORNEYS

Aug. 5, 1958 P. M. G. TOULON 2,846,498

COLOR TELEVISION OPTICAL FILTER SYSTEM

Filed March 28, 1952 3 Sheets-Sheet 2

INVENTOR.
P. M. G. TOULON
BY Morse & Hall
ATTORNEYS

Aug. 5, 1958 P. M. G. TOULON 2,846,498

COLOR TELEVISION OPTICAL FILTER SYSTEM

Filed March 28, 1952 3 Sheets-Sheet 3

INVENTOR.
P. M. G. TOULON

BY Moore & Hall

ATTORNEYS

United States Patent Office 2,846,498

Patented Aug. 5, 1958

2,846,498

COLOR TELEVISION OPTICAL FILTER SYSTEM

Pierre Marie Gabriel Toulon, New York, N. Y., assignor, by mesne assignments, to Moore and Hall, Washington, D. C., a partnership Application March 28, 1952, Serial No. 279,143

24 Claims. (Cl. 178—5.4)

Figure 1A:
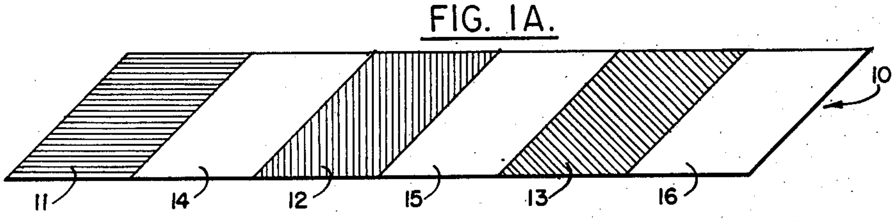

The present invention relates to color television systems and is more particularly concerned with a color changing screen to be utilized in such systems.

It is an object of this invention to provide a color changing screen, capable of operating slowly and continuously, which is readily adaptable to the reception of color television transmissions. A further purpose of this invention resides in the provision of a color changing screen which may be incorporated in a television receiver and which may be utilized with large screen receivers without unduly encumbering the receiver. A still further object of this invention lies in the provision of a color changing screen which is simple in construction, requiring relatively small accuracy in the color pattern disposed thereon.

The following description is primarily concerned with a screen for the reception of field sequential (C. B. S.) transmissions. As will be readily seen by those skilled in the art, however, the concepts disclosed herein may be readily employed in the reception of more complex transmissions, for example, the system of color television scanning disclosed in my copending application serial No. 163,285, filed May 20, 1950, for Color Television, now abandoned. This latter system, which I have termed "dispersion," contemplates the simultaneous scanning of three separated portions of a cathode ray picture tube, and the present invention may be adapted to the reception of such a system by suitable alteration of the angular displacement of the color bands of my color changing screen subsequently to be described.

The color changing screen of the present invention comprises a flexible transparent member, preferably made of plastic, and shaped in the form of an elongated parallelogram (though a rectangular shape is also possible). Disposed in the transparency are a plurality of transparent color bands respectively separated from one by other transparent bands which may be of the same color, but which are preferably clear. The overall transparent member has its opposite ends fastened together by a suitable adhesive to thereby form a continuous loop having color bands evenly spaced along the surface thereof This loop is placed in front of the picture face of a cathode ray picture tube and the loop is driven by any conventional mechanism, or by a preferred mechanism which will be described. As the loop is thus driven, color stripes in the front face thereof will pass in one direction, for instance from left to right, in front of the screen, while color stripes in the back face thereof will pass in the opposite direction. The superposed color stripes or bands on the front and back surfaces of the loop appear to intersect because of this counter-movement, the points of intersection providing a transparency of a single color at the instantaneous location of the cathode ray sweep. Because of the disposition of color bands and the speed of drive used, the intersections of the bands follow the sweep of the television raster, and successive colors of the transmission utilized follow one another in the transparency intersections.

The following description is directed toward systems utilizing three colors, herein termed red, blue, and green. As will be readily apparent, however, the screen of my invention may be used with systems using other basic colors and colors in number different from three. The only requirement of the colors chosen is that those colors represent the component parts, in proper proportion, of white light.

A modified form of my invention utilizes the above described form of loop, having considerably more color bands thereon, in conjunction with an optical system such as is described in my copending application Serial No. 267,821, filed January 23, 1952, now Patent No. 2,736,235, granted February 28, 1956, for Optical Lens System. This modification permits the speed of the loop to be considerably less than that of systems not employing the optical system.

Figure 1B:
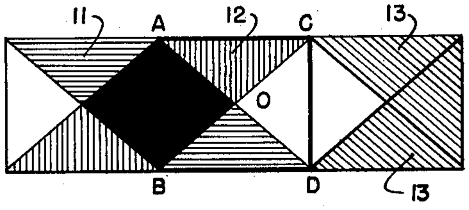
Figure 1C:
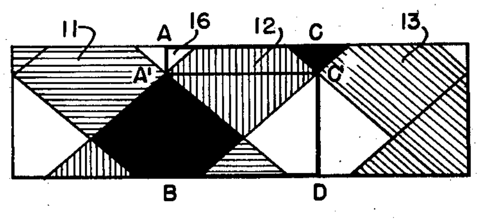
Figure 1D:
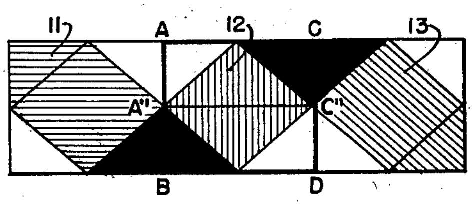
Figure 1E:
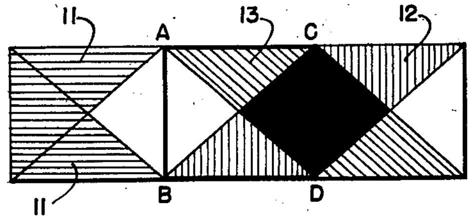
Figure 2:
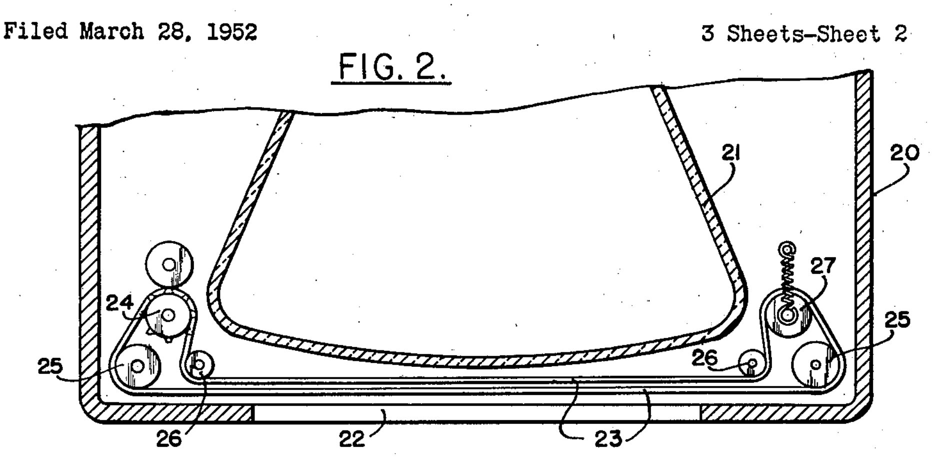
Figure 3A:
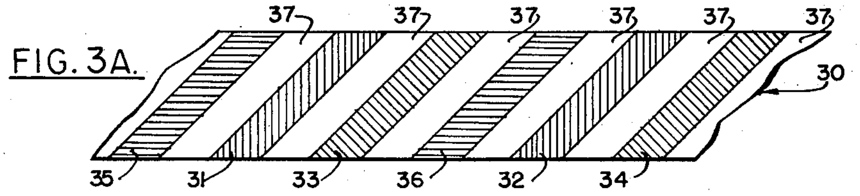
Figure 3B:
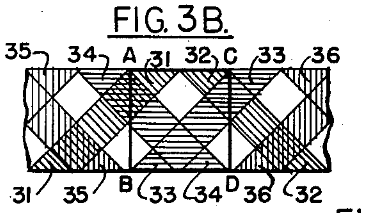
Figure 6A:
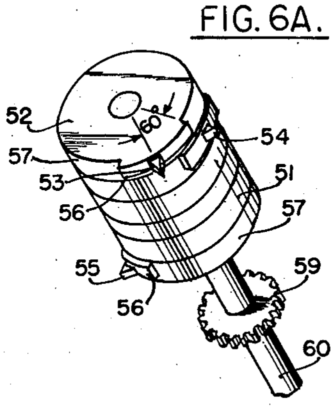
Figure 4A:
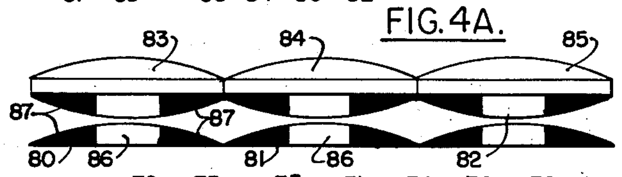
Figure 4B:
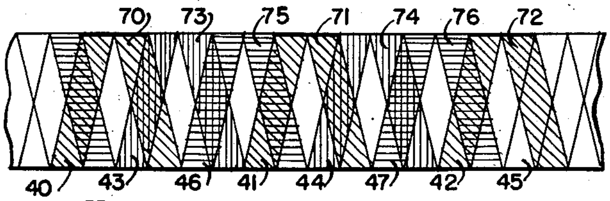
Figure 5:
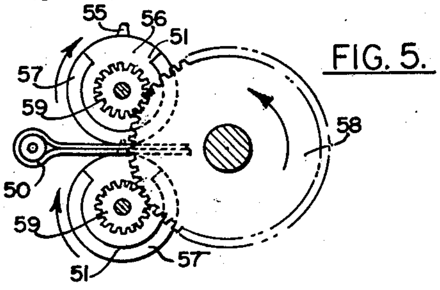
Figure 6B:
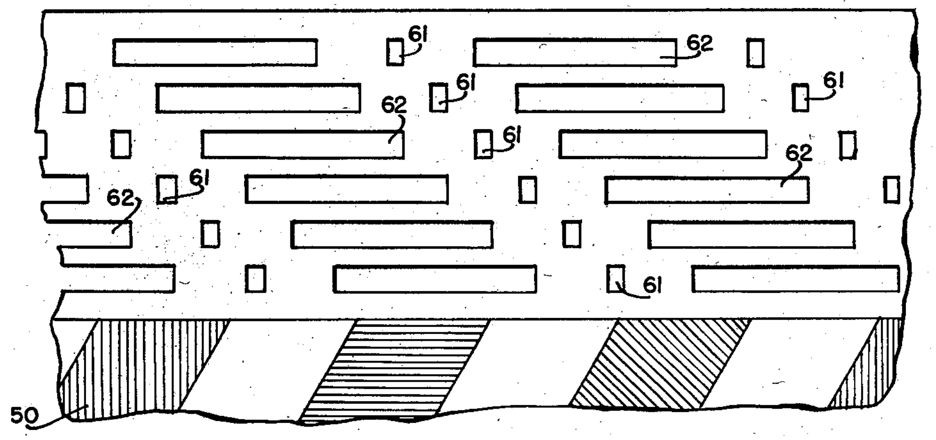
Figure 7:
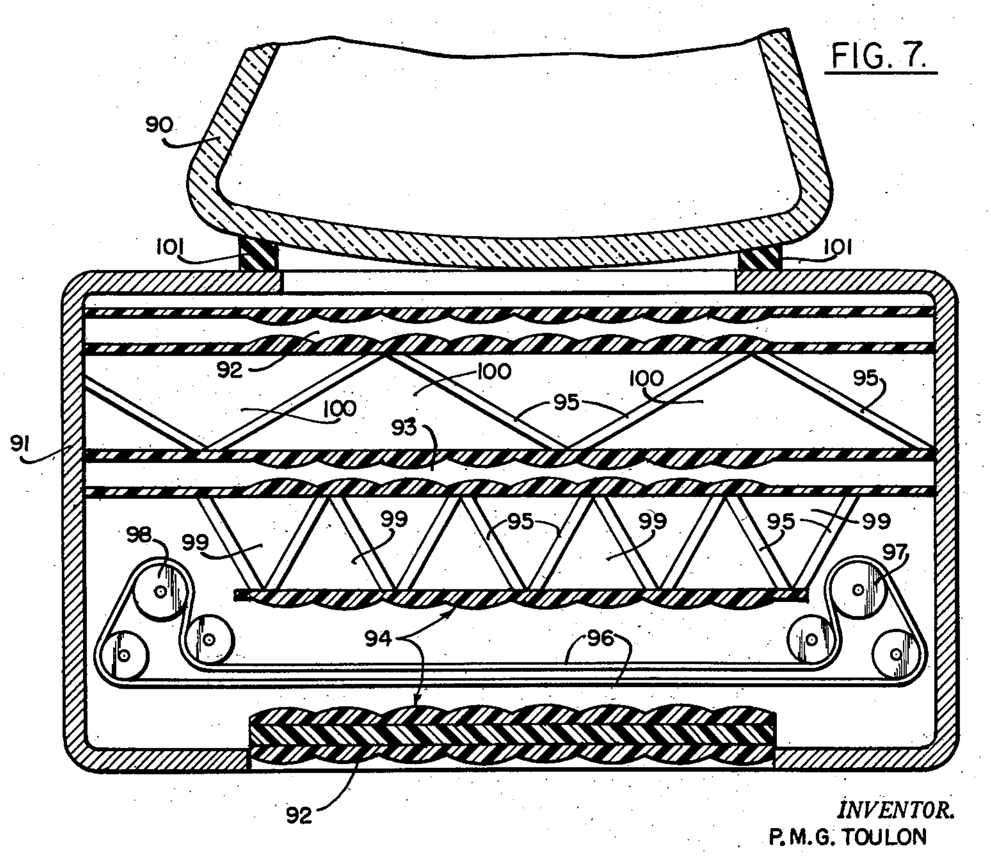

The above structure and advantages of my invention will be more readily seen from the following description and accompanying drawings in which:

Figure 1A represents the transparency member of my invention having the colored bands disposed therein, Figures 1B–1E depict the operation of the transparency, in the form of a loop, to follow the scan of a television raster, Figure 2 is a diagram illustrating the disposition of a loop, in accordance with my invention, in a television receiver, Figures 3A and 3B represent a modified form of my color loop, Figure 4A is a representation of an optical system employed to reduce the required speed of translation of the loop, Figure 4B illustrates a form of loop to be employed with the optical system of Figure 4A, Figure 5 illustrates a preferred type of drive to be used in moving the loops of my invention, Figure 6A shows, more precisely, one element of the drive of Figure 5, Figure 6B depicts a portion of a transparency loop adapted to be driven by the mechanism of Figure 5, and Figure 7 illustrates a system utilizing a color loop and optical system in a single unit for television receiver adaptation.

Referring now to Figure 1A, a basic form of my invention comprises a transparent member 10 having transparent bands 11, 12, and 13, respectively blue, red, and green in color, disposed therein. The color bands 11, 12, and 13, are respectively separated by clear bands 14, 15, and 16, and opposite ends of the member 10 are joined to effect a loop, as illustrated in Figures 1B–1E. This loop is placed in front of a television picture tube, not shown, the picture surface of which is represented by A—B—C—D.

The loop is driven by a mechanism, not shown, synchronized with the field frequency of the television transmission, and the end effect is that of two sliding bands, moving in opposite directions in close proximity to one another, in front of the cathode ray tube face.

In the field sequential system of color television transmission, signals representative of each of the primary colors of the video intelligence are placed upon the screen successively. Thus there is, for instance, a first field of red signals, followed by a second field of green signals, followed by a third field of blue signals, after which the sequence is repeated. Each of these fields are swept onto the picture tube in the form of a raster, and the color transparencies moving in front of the screen must not only follow the proper sequence of fields as to color but must also follow the downward sweep of the raster in each of the fields. These requirements are met by the arrangement shown here.

Referring first to Figure 1B, it may be seen that the loop arrangement is such that color bands appear on both the front and back portions of the loop. In the arrangement shown, the loop is so arranged with respect to the picture face A—B—C—D that, at a first instant of time, the top of red band 12 coincides with the top A—C of the picture face. Assuming that the red band is at this instant on the front portion of the loop which is driven from left to right, in the present example, the blue band appears on the rear portion of the loop, moving from right to left, and the green portion appears on both the front and rear portions thus reversing its direction of movement. Looking to the picture face A—B—C—D at the given first instant of time, the screen presents a red portion A—O—C caused by the superposition of red band 12 and clear band 16; a clear portion C—O—D caused by the superposition of clear bands 15 and 16; a blue portion D—O—B caused by the super position of blue band 11 and clear band 15; and a substantially black portion B—O—A caused by the superposition of red band 12 and blue band 11. At this instant of time, the television transmission is sweeping on the first line of red video information at line A—C, and a red transparency is there provided.

Looking now to Figures 1C—1E, it will be seen that, the translation of the loop portions being synchronized with the field frequency, as the red field is swept on to the picture face, the superposition of the forward and back portions of the loop provides a red transparency at each line of the raster. Thus, in Figure 1C, the line being scanned has moved downward to a position A'C', and the left-to-right movement of the red band 12, with the corresponding right-to-left movement of clear band 16, provides a red transparency at the position A'C'. Similarly, as shown in Figure 1D, a red transparency is present at the position A''C'', when, at a later instant of time, this line is being scanned; and again, at the final sweep of the red field under discussion, a red transparency is provided at position B—D, Figure 1E. Thus, the translation of the superposed bands has caused the red color transparency to follow the downward sweep of the red field.

Similarly, assuming that the green field is next swept onto the picture face, the green transparency on the back face of the loop, Figure 1E, is now in the correct position for reception of the first line of the green raster; and translation of the green band from right-to-left causes a downward sweep of the green transparency. As may be readily seen from the foregoing discussion, the downward color sweeps will follow sequentially, being effected next by the blue band on the front surface, then by the red band on the rear surface, then by the green band on the front surface, etc.

Figure 2 illustrates a television receiver, in horizontal cross section, utilizing a color loop of Figure 1. In practice the set comprises a cabinet 20 having a cathode ray tube 21 mounted therein. The cabinet 20 defines a viewing face 22 therein, and between this viewing face and picture tube 21 is mounted the color loop 23, which comprises, as shown, two oppositely traveling transparent sections. The loop may be driven at one end, in the present example, by a toothed wheel 24, the loop being provided with laterally disposed perforations to receive said wheel 24. The loop rides upon rollers 25 and 26, and may be held firmly in place by a spring biased roller 27. Other drive arrangements will readily suggest themselves to those skilled in the art.

I have shown a preferred drive mechanism for the various embodiments of my invention in Figures 5, 6A, and 6B. In this form of drive, both portions of the loop 50 are fed between two rotating drive members 51. Each of the members 51 comprises a main drum 52 which in turn has disposed around the periphery thereof six tooth portions, e. g. portions 53, 54 and 55. Each tooth portion is displaced from adjacent teeth in a vertical sense, and each is also shifted from adjacent teeth by a 60° phase displacement. Thus, each drum has six teeth disposed over the vertical dimension of the drum and evenly spaced around the periphery of the drum. Figure 6A shows only three of said teeth, the other three being disposed on the unseen surface of drum 52.

Each of the above described teeth is formed on a projection 56 extending from the body of the drum so that the tooth portion extends pronouncedly from the drum and a recess 57 is defined throughout the remaining peripheral surface in the plane of each tooth. The purpose of the recess 57 is to permit teeth of each drum to pass the body portion of its complementary drum freely and without interference. Each drum 51 is mounted on a shaft 60 having a gear member 59 thereon, and the drums are rotated in the same direction by a common drive gear 58 coupled to a motor (not shown).

When the above described drive is used, the loop 50 takes the form shown in Figure 6B, and a perforate section is provided in the body of the loop material preferably on the upper edge thereof. The perforations are of two types, relatively small apertures 61, and elongated apertures 62, and apertures 61 and 62 are alternately disposed about the periphery of the loop and in six phase shifted tiers. The phase shift of the apertures permits one tooth of each drum to engage one of the small apertures 61 in one portion of the loop while the teeth of the other complementary drum ride freely through the elongated apertures 62. When a tooth of one drum is in an aperture 61 in one portion of the loop it also is passing through an aperture 62 in the other portion, thus effecting a drive of a loop portion in only one direction. Since the entire loop is fed between the two drums 51, and the drums are rotating in the same direction, one drum tends to drive one portion of the loop in a first direction while the other drum drives the other portion of the loop in the opposite direction. The phase shift of teeth and apertures permit a constant speed drive to be effected with relatively small strain on the loop material. As may be seen in Figure 5, a freely rotating roller member may be provided in the outer extremity of the loop to effect stability of operation where the direction reversal of the loop takes place.

As will be appreciated, although the form of my invention described in Figure 1 is capable of accurately interpreting color transmissions, inasmuch as successive color fields are transmitted at a relatively high frequency the system has the disadvantage of the loop having to move at a relatively high velocity the device thus being practical only with relatively small pictures. A modified form of my invention, shown in Figures 3A and 3B, represents a more improved form of the loop described, in that the speed of translation is one-half that of the embodiment shown in Figure 1, thus reducing the wear and strain on the color screen and drive mechanism, and permitting the system's use in larger picture reception. The modification of Figure 3 again comprises a transparent member 30 having a plurality of color bands therein. Instead of using only one band of each color, each band having the same width as the picture face (the form of Figure 1), the modification uses two bands of each color, each band having ½ the width of the picture face. Thus there are two red bands 31 and 32, two green bands 33 and 34, and two blue bands 35 and 36, each of the color bands being separated from adjacent color bands by a clear section 37. As shown in Figure 3B, the transparency of a desired color is effected by superposition of two oppositely moving transparencies in a manner similar to that described in reference to Figure 1. However, in the form of Figure 3, the color bands are so arranged that a red band in the front surface is initially contiguous with another red band on the rear surface, and as the loop is translated the intersecting of the two red bands, each of which is ½ the width of the screen, provides a transparency of red across the entire picture face and moving downward in synchronism with the sweep of the red field. In the arrangement shown in Figure 3, the blue transparency then follows the red, and this, in turn, is followed by the green transparency. The sequence of colors may, of course, be changed by appropriate rearrangement of the sequence of color bands.

Even further speed reduction may be effected by employing the loop color changing screen of the present invention with an optical system of the type described in copending application Serial No. 267,821, filed January 23, 1952. The optical system therein described is adapted to be placed in front of a cathode ray picture tube face and comprises a plurality of contiguous, vertically disposed objective lenses, each lens being associated with a small portion of the picture screen. Each lens is therefor associated, for instance, with ten dots in each line of the television raster, and sufficient lenses are placed side by side so that every portion of the picture face has a complementary objective lens. The objective lenses, in turn, have complementary lenses for reversing or inverting the images produced thereby, and the individual images produced by each of the objective lenses are recombined on a front lenticular viewing surface. In effect, therefore, the optical system described splits each picture into, for instance, thirty vertical segments and then recombines these segments into a composite image of the original picture without any distortion. As will be seen from this description of the optical system, a loop color changer used with such a system may be provided with a large number of narrow color bands, and the translation of the loop for each color field need be only enough to provide a downward sweep of color in each of the individual segments produced by the lens system. Thus, if sufficient color bands are provided and disposed on the loop, red superposed bands may be provided in each of the thirty segments when a red field is being received, the horizontal translation of the loop for a vertical sweep of the red transparency then being only $\frac{1}{30}$ the width of the picture face, assuming thirty lens sections are used, and the required speed of translation being only $\frac{1}{30}$ that which would be necessary if no optical system were used. These red intersecting transparencies would then be followed by blue, and by green transparencies, as has been described.

Referring to Figures 4A and 4B, the former of which is merely symbolic to emphasize the relation of the lenses to the color bands, a horizontal cross section of a plurality of cylindrical diverging air lens elements 80, 81, and 82 is shown. The lenses 80, 81, and 82 are representative of intermediate lenses in the optical system described, there being for instance thirty such lenses, and each of the lenses 80, 81, and 82 has a complementary viewing lens 83, 84, and 85. The color loop, Figure 4B, is of the type already described comprising a plurality of color bands separated from one another by clear bands. Each color band is $\frac{1}{6}$ the diameter of each lens element, bands 40, 41, and 42 being red bands on the front portion of the loop, while 70, 71, and 72 are red bands on the rear, oppositely moving loop portion. Similarly green bands are represented at 43, 44, 45, 75, and 76, and blue bands are shown at 46, 47, 73 and 74. Each of the lenses 80, 81, and 82 has opaque material 87 applied to the edges thereof, thereby effecting diaphragm openings 86 in the center one-third of the lenses. Thus, in a manner similar to that described in reference to Figure 3B, the two superposed red bands (40—70, 41—71, 42—72) effect a vertical sweep of red in each of the lens element sections, this sweep being followed by a blue sweep and then by a green sweep.

The system of Figures 4A and 4B, while reducing the horizontal translation of the loop sections to a small fraction of its former necessary speed, requires considerably greater accuracy in the positioning of color bands and loop movement than the system of Figure 1. The drive mechanism and loop perforations of Figures 5 and 6 are especially advantageous in this embodiment, therefore, because of the great accuracy of movement of that system.

It should be noted that, when an optical system is used with my loop color changer, the colored bands may be contiguously disposed on the loop member, there being no separating transparent bands between adjacent color bands. Thus, the loop may have successive bands of the component colors of white light, each of the color bands being defined directly between other color bands. In this modification it should further be noted that no diaphragm openings need be defined in the optical system. This latter variation results from the fact that, when contiguous color bands are used, the superposition of different colored bands at the edges of the lenses automatically produces opaque sections at those edges, the color transparency being present only at the center of the lens because of the superposition of like-colored bands. This modification further reduces the problem of coincidence between a diaphragm opening in the optical system and the color transparency defined by the superposition of like-colored bands.

A horizontal cross section of a practical embodiment of the optical system and loop color changes is shown in Figure 7. Mounted on the outer surface of picture tube 90 is a box like receptacle 91 defining a lenticular viewing surface 92 in the front surface thereof. Within the container 91 is a first series of objective lenses 92 and two sets of diverging air lenses 93 and 94. The lens sections are preferably molded in plastic and are supported in place by transparent plastic spacers 95 and by the sides of container 91. A loop color changer 96 of the type described is mounted by rollers 97 and drive 98 between the plastic lenticular sheets forming lenses 94 (which sheets are actually closer together than is shown) and the spaces 99 and 100 between lenses 94 and 93 and between 93 and 92, are filled with a clear oil having substantially the same refraction index as that of the plastic employed to reduce the cost of the device. An oil bath may also be provided around the loop 96 to reduce reflection from the loop surface. The entire unit may be mounted adjacent tube 90 by adhesive supporting members 101.

Having thus described my invention, I claim:

1. A television color changing device comprising an elongated continuous loop of flexible material, a plurality of transparent bands of at least three different colors disposed along said loop throughout the entire length thereof, each of said color bands being separated from adjacent bands by additional substantially colorless transparent bands, and each of said color bands and said additional bands being obliquely disposed at a predetermined angle to the axis of elongation of said continuous loop.

2. The device of claim 1 in which said bands are of colors which are components of white light, the color bands being cyclically disposed as to color along the length of said loop, said additional bands being clear of all color.

3. In a color television apparatus wherein successive fields of different colored images are received in sequence at a predetermined repetition rate, a picture tube, a flat loop of flexible material in front of the face of said tube, a plurality of transparent oblique bands, having the colors of said successive fields, disposed along the length of said loop and separated from one another by additional transparent bands of clear material, said loop being so positioned that bands on a first face thereof are superposed on bands on a second face thereof in front of said picture tube, and drive means coupled to said loop causing said first and second faces to travel in opposite directions in front of the face of said picture tube the speed of said drive being such that a band of a given color will traverse the picture face of said tube during the reception of a single of said successive fields.

4. The system of claim 3 in which said bands are shaped as parallelograms having their long dimensions parallel to one another, the short dimensions of each of said bands being of substantially the same width as the picture face of said tube and the the long dimensions of each of said bands being substantially equal to a diagonal of said picture face.

5. The system of claim 3 in which said bands are shaped as parallelograms having their long dimensions parallel to one another, each of said bands having short dimensions of substantially one-half the width of the picture face of said tube.

6. In a color television system wherein successive fields of different colored images are received in sequence at a predetermined repetition rate, a picture tube, a flat loop of flexible material disposed in front of said tube, a plurality of differently colored bands obliquely disposed along said loop and separated from one another by additional bands of clear material, a plurality of lens surfaces between said loop and said picture tube, said lens surfaces analyzing a television picture on said picture tube as a plurality of vertically disposed elementary images contiguous with one another, and drive means translating the two elongated portions of said flap loop in opposite directions past said lens surface whereby the color bands on said two elongated portions are superposed and intersecting before said lens surface, the speed of said drive being such that a given color band will traverse a single one of said elementary images during the reception of a field of said given color.

7. The system of claim 6 in which each of said lens surfaces includes spaced light opaque portions to define a light passing aperture of predetermined width therebetween, the width of each of said colored and clear bands being substantially equal to one-half that of each of said light passing apertures.

8. The system of claim 7 in which said colored and clear bands are so located along said tape with respect to said apertures that at the beginning of the reception of a given color field a band of said color on one elongated portion of said tape is in contiguous non-overlapping relation before one of said apertures with a further band of said color on the other elongated portion of said tape.

9. The system of claim 5 in which said bands are so disposed along said tape that the short dimension of a given colored band on the said first face of said loop and the short dimension of a further band of the same color on the second face of said loop are in contiguous non-overlapping relation adjacent the top of said picture face at the beginning of reception of a field of said color.

10. A color television receiver for a field-sequential polychrome television system, comprising a picture tube having means for producing a cathode ray beam therewithin, a screen and means for periodically and cyclically sweeping said beam across said screen to form an image raster, said beam being modulated in intensity in accordance with a polychrome field-sequential video signal to produce a monochrome image on said screen, said image being formed by successive color fields representative of the primary color components of the polychrome scene being transmitted; and a color converter for converting said monochrome reproduced image into a polychrome produced image, comprising an endless filter band disposed in a narrow loop having two planar portions disposed parallel and closely adjacent to one another and positioned in front of said picture tube screen with the width of said filter band arranged along the vertical dimension of said image raster and with said band completely covering said raster, said filter band comprising an endless sequence of filter strips arranged parallel to one another and of equal width, said strips being cyclically of the respective primary colors of said polychrome television system, each of said strips being slanted with respect to the vertical by being offset from the vertical by a distance equal to a multiple of one-half the strip width, and means for moving said filter band horizontally at a uniform speed synchronized with the field repetition rate of the said television system, with said filter band moving a horizontal distance equal to said offset in the time interval of the duration of a single field.

11. A color television receiver for a polychrome field-sequential television system comprising a picture tube having a screen, an endless filter band arranged in a narrow loop having two planar portions disposed parallel and closely adjacent to one another and covering said picture tube screen, said filter band comprising an endless sequence of generally vertical linear filter strips parallel to one another and of uniform and equal width, said strips being of the respective primary colors of said television system repeated cyclically around the entire filter band loop, each of said strips being slanted with respect to the vertical, and means for moving said filter band horizontally at a uniform speed synchronized with the field repetition rate of said television system.

12. A color television receiver for a polychrome field-sequential field system, comprising a picture tube, means for producing on said picture tube an image formed by successive color fields representative of the primary color components of the polychrome scene being transmitted, and an endless filter band having filter strips of the respective primary colors of said television system repeated cyclically around the entire loop of said filter band, said band having two portions thereof juxtaposed in front of said picture tube, whereby said picture tube may be viewed only through both of said filter band portions, and said filter strips being slanted with respect to the vertical edge of said image.

13. A color receiver as in claim 12, further including means for moving said band horizontally at uniform speed synchronized with the field repetition rate of said system.

14. In a color television receiver of the field-sequential type having a picture tube with a cathode ray beam therewithin swept periodically and cyclically across a screen to form an image raster, a color converter comprising an endless filter band disposed in a narrow loop having two planar portions disposed parallel and closely adjacent to one another and adapted to be positioned in front of the screen of said picture tube, said filter band comprising an endless sequence of generally vertical linear filter strips parallel to one another and of uniform and equal width, said strips being transmissible of light of the respective primary colors of said television system cyclically arranged around the entire loop of said filter band, each of said strips being slanted with respect to the vertical and having an offset from the vertical defined by an acute angle whose tangent is substantially a multiple of one-half the ratio of the width of said filter strips to the height of said image raster, and means for moving said filter band horizontally at a uniform speed substantially equal to the product of the multiple of one-half the width of said filter strips and the color field repetition frequency of said television system.

15. In a color television receiver for a field-sequential polychrome television system, an endless filter band disposed in a narrow loop having two closely juxtaposed portions, said portions being adapted to be positioned closely in front of a picture tube to cover the screen thereof, said filter band comprising an endless sequence of filter strips parallel to one another and of equal width, said strips being transmissible of the respective primary colors of said polychrome television system repeated cyclically around the entire loop of said filter band, each of said strips being slanted with respect to the vertical by an angle whose tangent is substantially equal to an integral multiple of half the width of said strips divided by the effective height of said screen, and means for moving said filter band horizontally at a uniform speed substantially equal to the product of said multiple strip half-width and the field repetition frequency of said system.

16. Apparatus for converting a monochrome image produced on the screen of a picture tube supplied with field-sequential polychrome video signals to a polychrome reproduced image, comprising an endless filter band having two overlapped portions thereof adapted to be disposed in front of the screen of said monochrome picture tube, said filter band comprising an endless sequence of equal width filter strips of the respective primary colors of said polychrome television system, cyclically repeated around the entire loop of said filter band, each of said strips being slanted with respect to the vertical, and means for moving said filter band horizontally at a uniform speed, with one of said overlapped portions proceeding in one direction and the other of said portions proceeding in the opposite direction, said speed being synchronized with the field repetition rate of said television system.

17. In a color television receiver for a polychrome field-sequential television system having a picture tube with a light-producing screen, an endless filter band having a pair of planar portions disposed closely adjacent to one another and adapted to be positioned before said light-producing screen of said picture tube, said filter band comprising an endless sequence of filter strips of the respective primary colors of said polychrome television system cyclically repeated around the entire loop of said filter band, said strips being slanted at an acute angle with respect to the vertical, and means for moving said filter band horizontally with said pair of portions thereof moving in opposite directions at uniform speed and synchronized with the field repetition rate of said television system.

18. A filter arrangement for polychrome color television receivers, comprising an endless filter band disposed in a narrow loop having two planar portions disposed parallel and closely adjacent to one another, said filter band comprising an endless sequence of inclined linear filter strips parallel to one another and of uniform and equal width, such strips being of the respective primary colors of said polychrome television system repeated cyclically around the entire loop of said filter band, each of said strips being slanted with respect to the vertical at an acute angle whose tangent is substantially equal to an integral multiple of one-half the ratio of the width of said strips to the height of the picture tube image raster with which said filter band is designed to cooperate.

19. In a color television receiver for a field-sequential polychrome television system, an endless filter band having two planar portions disposed closely adjacent to one another, said filter band comprising an endless sequence of linear filter strips of the respective primary colors of said polychrome television system cyclically repeated around the entire loop of said filter band, each of said strips being slanted at an acute angle with respect to the transverse dimension of said band.

20. A filter for use with color television receivers, comprising an endless filter band comprising an endless sequence of narrow linear filter strips parallel to one another and of uniform and equal width, said strips being of three respective substantially non-overlapping light transmissibilities in the visible light spectrum repeated cyclically around the entire loop of said filter band, each of said strips being at an acute angle with respect to the transverse dimension of said band.

21. A filter as in claim 20 wherein said band has a pair of parallel closely adjacent plane portions.

22. Color television apparatus for a polychrome field-sequential television system, comprising an endless filter band having an endless sequence of filter strips of the respective primary colors of said television system repeated cyclically around the entire loop of said filter band, each of said strips being slanted with respect to the transverse dimension of said band.

23. A filter for use with color television receivers, comprising an endless filter band having an endless sequence of narrow filter strips, each adapted to transmit light of a respective one of three substantially non-overlapping portions of the visible light spectrum, said strips being cyclically repeated around the entire loop of said filter band, each of said strips being slanted with respect to the transverse dimension of said band.

24. A color television receiver comprising a picture tube having a raster with a generally vertical edge and means including an endless filter band overlying the screen of said picture tube and having an endless sequence of parallel filter strips slanted relative to said raster edge and providing a monochrome transparency line moving vertically before said screen at the same rate as the vertical scansion of said picture tube.

References Cited in the file of this patent

UNITED STATES PATENTS

| | | |
|---|---|---|
| 2,024,051 | Middelroad | Dec. 10, 1935 |
| 2,274,039 | Cawley | Feb. 24, 1942 |
| 2,570,723 | Schade | Oct. 9, 1951 |
| 2,630,485 | Heikes et al. | Mar. 3, 1953 |
| 2,689,879 | Rehorn | Sept. 21, 1954 |
| 2,720,553 | Toulon | Oct. 11, 1955 |
| 2,728,814 | Berger | Dec. 27, 1955 |